United States Patent
Deixler et al.

(10) Patent No.: US 11,363,699 B2
(45) Date of Patent: Jun. 14, 2022

(54) DEVICE FOR PROVIDING AN ACTION UPON DETECTING AN OBJECT IN A SPACE

(71) Applicant: SIGNIFY HOLDING B.V., Eindhoven (NL)

(72) Inventors: Peter Deixler, Arlington, MA (US); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/268,550

(22) PCT Filed: Aug. 12, 2019

(86) PCT No.: PCT/EP2019/071528
§ 371 (c)(1),
(2) Date: Feb. 15, 2021

(87) PCT Pub. No.: WO2020/035429
PCT Pub. Date: Feb. 20, 2020

(65) Prior Publication Data
US 2021/0315084 A1    Oct. 7, 2021

(30) Foreign Application Priority Data
Aug. 14, 2018 (EP) .................................... 18188914

(51) Int. Cl.
*H05B 47/115* (2020.01)
*H04W 24/08* (2009.01)
(Continued)

(52) U.S. Cl.
CPC .......... *H05B 47/115* (2020.01); *G01S 13/003* (2013.01); *H04W 24/08* (2013.01); *H05B 47/19* (2020.01)

(58) Field of Classification Search
None
See application file for complete search history.

(56) References Cited

U.S. PATENT DOCUMENTS

| 9,642,218 B1 | 5/2017 | Dureiko et al. |
| 2008/0218334 A1 | 9/2008 | Pitchers et al. |

(Continued)

FOREIGN PATENT DOCUMENTS

| CN | 102158326 A | 8/2011 |
| WO | 2016134976 A1 | 9/2016 |
| WO | 2017171299 A1 | 10/2017 |

OTHER PUBLICATIONS

A.R. Jiménez, et al., "Combining RSS-Based Trilateration Methods With Radio-Tomographic Imaging: Exploring the Capabilities of Long-Range RFID Systems," 2015 Int. Conference on Indoor Positioning and Indoor Navigation (IPIN), Oct. 2015 (10 Pages).

*Primary Examiner* — Anh Q Tran

(57) ABSTRACT

The invention provides a device for providing an action upon detecting an object in a space, the device comprising a processor configured to: obtain sensor data recorded by a portable sensor associated with the object; determine a first movement pattern from said sensor data; obtain communication data comprising wireless communication signals exchanged between electronic devices of a wireless network within said space; determine a second movement pattern from said communication data; determine whether said first movement pattern matches with said second movement pattern, so as to detect the object in said space; and perform an action upon determining a match.

15 Claims, 2 Drawing Sheets

(51) Int. Cl.
  *G01S 13/00*  (2006.01)
  *H05B 47/19*  (2020.01)

(56) References Cited

U.S. PATENT DOCUMENTS

| | | | |
|---|---|---|---|
| 2015/0237479 A1* | 8/2015 | Fung | H04W 4/026 |
| | | | 455/456.6 |
| 2017/0131125 A1 | 5/2017 | Wilson et al. | |
| 2021/0041523 A1* | 2/2021 | Murthy | G01S 13/86 |

* cited by examiner

DEVICE FOR PROVIDING AN ACTION UPON DETECTING AN OBJECT IN A SPACE

CROSS-REFERENCE TO PRIOR APPLICATIONS

This application is the U.S. National Phase application under 35 U.S.C. § 371 of International Application No. PCT/EP2019/071528, filed on Aug. 12, 2019, which claims the benefit of European Patent Application No. 18188914.8, filed on Aug. 14, 2018. These applications are hereby incorporated by reference herein.

FIELD OF THE INVENTION

The invention relates to a device for providing an action upon detecting an object in a space wherein the device is, in a preferred example, a lighting device. The invention further relates to a system for providing an action upon detecting an object in a space. The invention further relates to a method of providing an action upon detecting an object in a space. The invention further relates to a computer program product.

BACKGROUND OF THE INVENTION

Presence detection and/or motion detection is widely known in the art. Many forms of presence detectors and/or motion detectors exist. For example: a camera; a thermal camera; an infrared (IR) motion detector, either active or passive (PIR); a microwave sensor for detecting movement; a microphone or a microphone array suitable for audio-based localization; a radiofrequency (RF) sensor; a time of flight sensor (ToF); etcetera. Enabled by such technologies, presence detection and/or motion detection may also provide numerous applications. For example, lights may be automatically activated/deactivated based on the detected presence of a person; an elderly person falling on the ground may be detected; apparatuses may be commissioned based on the detection of gesture motion; the path of an object may be tracked within a warehouse; etcetera.

The present invention relates to a device for providing an action upon detecting an object in a space. Such a device and a corresponding system may be known from US2017/0131125A1, which discloses device-free motion and presence detection. More specifically, the corresponding systems and methods disclosed therein make use of a mesh network radiofrequency (RF) (based) sensing technology that can detect and quantify the presence/motion of people and other objects within an area of interest.

However, such a presence/motion detection based on RF (based) sensing may be disadvantageous, because RF (based) sensing is still susceptible to false positives or false triggers; e.g. even with object detection, the identity of a detected object may still be unknown. Such false positives or false triggers should be reduced or prevented. Moreover, even when the RF based sensing technology is fine-grained, it may still cope with an inability to uniquely identify users. The application of such RF based sensing technology may in many cases therefore be limited to applications which only comprise non-personalized detection and responses.

SUMMARY OF THE INVENTION

It is an object of the invention to provide an improved device, which at least alleviates the problems mentioned above. Thereto, the invention provides a device for providing an action upon detecting an object in a space, the device comprising a processor configured to: obtain sensor data recorded by a portable sensor associated with the object; determine a first movement pattern from said sensor data; obtain communication data comprising wireless communication signals exchanged between electronic devices of a wireless network within said space; determine a second movement pattern from said communication data; determine whether said first movement pattern matches with said second movement pattern, so as to detect the object in said space; and perform an action upon determining a match.

Said device comprises a processor configured to obtain sensor data. The sensor data is recorded by a portable sensor associated with an object to be detected within a space. The portable device may for example be a wearable device. The sensor data may e.g. be received from said portable sensor or from a portable device in which the portable sensor is embedded, either directly via e.g. wireless communication and/or via e.g. a bridge or a getaway. The sensor data may alternatively e.g. be retrieved from a database, a cloud, a memory device or server wherein the sensor data is logged. Said portable sensor may alternatively be a set of portable sensors. Hence, in examples, the processor may be configured to obtain sensor data recorded by a portable sensor from the portable sensor, or a portable device comprising said portable sensor, associated with the object.

From said obtained sensor data, a first movement pattern may be determined and/or deduced. Thus, the processor may comprise computational power to analyze said sensor data and determine said first movement pattern. This first movement pattern characterizes the movement of said object. The obtained sensor data may for example comprise a speed, a direction, an orientation, or an acceleration of the object, which may e.g. have been recorded with one of an accelerometer, an altimeter, a heartrate sensor, or a gyroscope, a magnetometer, etc. Moreover, in some alternative examples, the sensor data may be processed locally by the portable sensor into a first movement pattern, which first movement pattern may subsequently be provided to the processor, such that the processor may obtain said first movement pattern directly. The processor may be a single processor or a distributed processor.

Further, said processor is also configured to obtain communication data, which comprises wireless communication signals exchanged (in time) between electronic devices of a wireless network within said space. Thereby, the object may have been interfering with said communication signals of the wireless network within said space. Therefore, from said obtained communication data (e.g. by analysis thereof), a second movement pattern may be determined and/or deduced. For example: the second movement pattern, which characterizes the movement of said object, may be determined via RF based sensing. In examples, said determining a second movement pattern from said communication data may be determining at least one second movement pattern from said communication data. Hence, a plurality of second movement patterns may be determined and assessed for a match in subsequent steps.

Subsequently, advantageously leveraging the combination of wireless sensing (such as e.g. RF based sensing) with the sensing based on the sensor data recorded locally by the portable sensor associated with the object, the object in said space may be detected. Namely: the processor determines whether the first movement pattern matches (or corresponds) with said second movement pattern. An accurate match may be found, which is less susceptible to false positives or false triggers, because the object detected via the (e.g. RF-based sensed) second movement pattern may be directly correlated and/or confirmed with the object detected via the (wearable-sensor-sensed) first movement pattern. Said performing an action upon determining a match may be phrased as performing an action when a match (between the first movement pattern and said second movement pattern) is e.g. determined, confirmed, or established. The match detects the object in said space.

In an aspect, applying to the embodiments throughout the application, the first movement pattern may be defined relative to gravity, and the second movement pattern may be defined relative to gravity; e.g. both by known means of signal processing or and/or data acquiring via sensors.

In aspects, the first movement pattern may e.g. be a trajectory of the portable sensor, and/or the second movement pattern may e.g. be a trajectory of the object in said space. Such a trajectory may comprise a shape characteristic of said movement, e.g. zig-zagging or L-shape, or U-turn, moving up-down, etc.

Upon determining such a match, the processor may be configured to perform an action. The action may thus be a personalized action, as it may be known from the portable sensor, which object is associated therewith. The processor may thus initiate or control a personalized effect to be provided.

As a result of the above: Said device meets the objective of detecting presence and/or motion of a specific object with fewer false positives, fewer false negatives, and/or fewer false triggers.

Moreover, as the device of the present invention does not require dedicated sensor hardware for presence detection and/or motion detection, but merely requires a transceiver for communicating data, the present invention may be attractive to cost-sensitive devices/systems such as the Philips Hue or Philips InterAct Pro, which for cost- or aesthetic reasons do not include luminaire-based or luminaire-integrated motion-sensing hardware.

Regarding to fewer false negatives: For example, having RF-based sensing alone, the RF-based sensing may detect a pattern which is too 'small' to be classified as a movement pattern of an object. Such RF-based sensing alone may therefore not conclude a detection. It may for example detect said pattern as noise. However, according to the present invention, the first movement pattern determined from the sensor data of the portable sensor may also (independently) render a similar pattern too 'small' to be classified as a movement pattern of an object. Hence, as said first movement pattern matches with said second movement pattern, an object may still be detected, because the RF-based detection initially considered as noise when RF-based sensing is taken alone, is now advantageously confirmed by the detection of the matching first movement pattern of the portable sensor. Therefore, instead of noise, a detection is concluded. Thus, false negative may be prevented, and an improved system is provided.

Said movement pattern may be referred to as a movement signature, a movement or motion fingerprint, or movement profile. Said movement pattern may be a trajectory or path. Machine learning may e.g. further educate the device in recognizing said movement patterns. Said movement pattern may e.g. be a gesture, e.g. a gesture of a human.

Thus, in examples, the portable sensor may be one of an accelerometer, an altimeter, a gyroscope, an orientation sensor, a magnetometer, a temperature sensor, a pressure sensor, a microphone, or any combination thereof, etc.

In an embodiment, the object is one of: a person, a vehicle, a robot and/or drone, an animal. It may be advantageous to detect such objects. For example, detecting a person may improve control applications and/or safety applications, and/or comfort (e.g. airflow in conference room dynamically adapted to number of occupants). For example, detecting a vehicle, a robot, or drone may be advantageous in traffic control or traffic safety, or autonomous driving.

In an embodiment, the device may be part of the wireless network, and/or the device further comprises a radiofrequency transceiver for communicating with at least one electronic device of the wireless network. This embodiment is advantageous, because the wireless communication signals exchanged by the device itself may be utilized for determining the second movement pattern and detecting the object. Therefore, the device may not be fully dependent on the wireless communication signals exchanged by other electronic devices in the wireless network within said space. Moreover, as the device may comprise a radiofrequency transceiver for communicating with at least one electronic device of the wireless network, RF based sensing may be performed in determining the second movement pattern.

The wireless network according to the invention may for example be a Wi-Fi network, a ZigBee network, a Bluetooth network, a GSM network, or a combination thereof.

In an embodiment, said wireless network may be a wireless lighting network. Due to the common nature of a (wireless) lighting network often comprising a dense grid of nodes the communication data comprising wireless communication signals exchanged between the nodes may be widely present in a space. For example, office lighting or retail lighting and/or industry/warehouse lighting may comprise a plurality of luminaires with wireless connectivity communicating with a plurality of wireless wall switches and/or bridge devices. Therefore, in a wireless lighting network, the exchange of wireless communication signals may already be present for providing a first function or an initial function not related to presence and/or motion detection. This facilitates the determining of the second movement pattern and detection of the object.

Alternatively, said wireless network may be a building management network, e.g. a network of HVAC devices and/or wireless sensors thereof.

Thus, in aspects, said wireless network comprises a first function related to wireless communication and not related to presence detection and/or motion detection, wherein the wireless communication signals are not initially intended for presence detection and/or motion detection, but wherein the communication data comprising the wireless communication signals exchanged between electronic devices of the wireless network are advantageously used by the device according to the invention for a secondary function related to presence detection and/or motion detection of the object. Optionally, the timing of the wireless communication signals that are not initially intended for presence detection and/or motion detection may be altered to enhance the performance of the RF-based sensing. Such wireless communication signals exchanged between electronic devices may for example comprise lighting setting commands, software updates, beacon information, security keys, etc.

Such a lighting network may further comprise a plurality of lighting devices. Such lighting devices may include one of: a luminaire, a lamp, a TLED, a plug-in connectivity unit for a luminaire, a wall switch, a bridge device, an outlet plug, a HVAC actuator, a thermostat etc.

Hence, partly considering the above, in an embodiment, the device may be one of: a lighting device, e.g. a luminaire; a wall switch; a bridge; a speaker; a server; or a sensor device; a thermostat; a smart-assistant; a HVAC or building management (BM) device; an access control device (e.g. badge reader); a window blind controller. Such devices may not initially be intended for presence detection and/or motion detection, or may even not comprise a dedicated presence sensor and/or motion sensor, but still be able to communicate wirelessly over a wireless communication network and comprise a processor configured to perform the actions according to the invention, advantageously leveraging any received sensor data and/or communication data (for RF-based sensing). Thus, as the present invention provides additionally an accurate detection functionality to such a device from said list, such a device may be advantageous next to its primary functionality.

In alternative aspects, said device may be a portable device which comprises said portable sensor. Hence, the invention may relate to a device-centered detection, wherein the portable device both detects its first movement pattern and via RF based sensing its second movement pattern, thereby improving the presence/motion detection accuracy. The portable device may thereby also communicate with the other electronic device, which may particularly be lighting devices.

As mentioned, said processor is also configured to obtain communication data, which comprises wireless communication signals exchanged between electronic devices of a wireless network within said space. Thereby, the object may have been interfering with said communication signals of the wireless network within said space. In an embodiment, the second movement pattern may be determined by measuring a change of a parameter of the wireless communication signals resulting from a distortion with said wireless communication signals. The distortion may for example be caused by the object or another object. Said distortion may be an interference. Nevertheless, the distortion (or: interference) will render a change of a parameter of the wireless communication signals, and thereby form a basis for the determination of the second movement pattern. The second movement pattern can thereafter be assessed to determine whether it matches the first movement pattern. Moreover, said measuring of a change of a parameter may be performed during a time window.

This embodiment is advantageous, because a change of a parameter of the wireless communication signals may detect a movement pattern well, such as e.g. RF based sensing. The general insight here is that objects may influence, interfere, affect, reflect, divert, absorb and/or block wireless communication signals. Therefore, a good indication of a movement of an object may be provided, by establishing a baseline for a parameter of the wireless communication signal and comparing changes thereof within a window of time. Thus, the above phrasing 'resulting from a distortion ' may comprise e.g. reflection, diversion, absorption, blocking of wireless communication signals by the object or any other object, or architectural feature within/of said space.

In an embodiment, the parameter may be an RSSI value. Such RSSI value may be affected by objects accordingly, hence may provide a proper parameter to perform the measuring (i.e. sensing) according to the invention.

Here, applying RF based sensing may be advantageous. RF based sensing is able to detect even minor movements such as a person breathing, typing or watching television. Hence, RF based sensing is capable to detect and classify movement signatures. This is achieved by verifying within a certain time window how much the parameter(s) of the wireless communication signals have varied with respect to a previous threshold/baseline, whether these changes significantly exceed a certain level such that they cannot be attributed to channel noise, whether the combined variations match a specific pattern known to only be attributable to motion, etc.

Moreover, in addition to movement detection, RF based sensing can perform true presence detection; for true presence detection, RF based sensing analyses a semi-static offset in RF disturbance compared to a known default background without the person (i.e. baseline) (e.g. determined over a long period of time by machine learning). Presence may be inferred by observing a shift in absolute values of the parameter(s) of the wireless communication signals compared to said default background without the person (i.e. baseline); because the properties of the person (even when not moving) may interfere with the wireless communication signals and affect the value of a parameter thereof.

In embodiments, said parameter may be one of: delays in transmissions due to CCA (Clear Channel Assessment); or a number of retries.

Hence, in aspects of the invention, the processor may be arranged to establish at least one baseline between said wireless signals exchanged between electronic devices of the wireless network within said space; wherein the processor may be arranged to determine the second movement pattern from said communication data based on said baseline. Here, based on said baseline may indicate determining the second movement pattern by determining a difference in the (subsequently) obtained (or measured) wireless signals exchanged between the electronic devices of the wireless network and said at least one baseline.

It may additionally be advantageous to increase the amount of wireless communication signals within the space of the object, such that the object may more easily be detected by means of determining the second movement pattern from the communication data. Therefore, in an embodiment, the processor may be further configured to instruct at least one electronic device of said electronic devices to increase exchanging wireless communication signals. Said electronic device may e.g. be the device according to the invention itself whenever it is part of the network. Moreover, for example, the device according to the invention may in some alternative examples also increase its own exchange of wireless communication signals by e.g. sending out/receiving messages. Such signals may either be broadcast messages or unicast messages. This improves the detection quality in radiofrequency-based sensing, because more wireless signals are present, i.e. in the wireless spectrum.

Furthermore, the device may comprise means to determine the signal quality and/or latency of determining the second movement pattern. Whenever said signal quality and/or latency falls below a predefined threshold, the processor may start instructing the at least one electronic device of said electronic devices to increase exchanging wireless communication signals; or the device itself boosts the exchange of wireless communication signals. Said signal quality and/or latency may for example also be effectiveness and/or speed; or any other metric indicative of the effectiveness of determining the second movement pattern.

Alternatively, the processor may be further configured to instruct at least one electronic device of another wireless network within said space to increase exchanging wireless communication signals.

Moreover, in alternative embodiments, the processor may be further configured to instruct at least one electronic device of said electronic devices to send a wireless communication signal at an adjusted moment in time for improving the RF based sensing. Said adjusted moment in time may for example be timing a large amount of data transfer, e.g. energy reports, software updates, etc. during a moment in time wherein a need is present for presence and/or motion detection via RF-based sensing.

Moreover, in other embodiments, the processor may be further configured to instruct at least one electronic device of said electronic devices to decrease exchanging wireless communication signals. Said electronic device may e.g. be the device according to the invention itself whenever it is part of the network. For example, RF based sensing may be improved when some ill-located transceiving electronic devices are instructed to limit their exchange of wireless communication signals, whereas others e.g. may remain the same or increase. In addition, for example, certain electronic devices in the wireless network may be instructed to reduce the amount of wireless signals, while others increase them (for instance, if multiple luminaires in the room measure ambient temperate, the device or the system according to the invention may reallocate which of the luminaires in the room how often reports the temperature to the central server in order to optimize the RF-based sensing).

Moreover, in alternative embodiments, the processor may be further configured to scavenge (or: listen, or: search, or: harvest) for other data exchanged between the electronic devices of the wireless network within said space, so as to include said other data to the communication data; wherein the second movement pattern is determined from said communication data including said other data. Thus, in such alternative embodiments, the device does not necessarily need to increase the traffic (i.e. wireless communication signals) between said electronic devices in order to improve the RF based sensing, but alternatively the device may extract insights from other traffic (i.e. wireless communication signals) already taking place, but e.g. not being taken into account already. Thus the processing efficiency is thereby boosted/improved by increasing the amount of already available signals to be assessed within the assessment. The device may e.g. be instructed to scavenge for leftover signals already present within said space.

Moreover, in alternative embodiments, the processor may be further configured to obtain further communication data comprising wireless communication signals exchanged between further electronic devices of a further wireless network within said space. Hence, the device according to the invention may extract insights from other wireless networks and their exchanged wireless communications signals. The device may hereby first establish a baseline, which may be used to compare subsequently obtained wireless communication signals. For example, said further communication data may comprise a group command for lighting controls, or ZigBee messages on another ZigBee network with different PAN ID.

As mentioned, upon determining a match, the processor may be configured to perform an action. In an embodiment, the action may be at least one of: inducing a visual signal, auditory signal, or vibrating signal; turning on a lighting device; providing a detection signal of having detected the object; localizing and identifying the object; adjusting the HVAC; adjusting the state of the security system; adjusting the emergency lighting system; adjusting the life safety system of the building. Moreover, said action may be at least one of: dispensing a substance, such as e.g. a perfume/smell; mechanical actuation, such as e.g. switching a relay e.g. to charge a battery or close a door; actuating a switch board, actuating an emergency stop button, which e.g. may be advantageous in industry setting wherein a presence of a person detected in a dangerous area may automatically and accurately switch the emergency button.

As mentioned, the action may be a personalized action, as it may be known from the portable sensor, which object is associated therewith. Hence, in an embodiment, the processor may be configured to obtain identification data for identifying the identity and/or class of the object. The identification data may for example be within a dataset together with the sensor data, or be part of the sensor data. The identification data may be sent to the device by a portable device comprising said portable sensor.

In a further embodiment, the action further comprises setting a lighting setting of a lighting device based on the identity and/or class of the object. As the device according to the invention is able to accurately detect said object and/or also determine its identity and/or also determine its position via the determination of the second movement pattern (via e.g. RF-based sensing), the device according to the invention may perform an action comprising controlling a lighting device to provide a personalized lighting setting associated with the identity of the object and/or its location and/or its activity. The lighting setting may e.g. be a lighting scene or HVAC temperature, e.g. tailored to the detected object.

For example, class of the object may be e.g. a type of a hospital crash cart; e.g. infusion tool requiring certain light settings to ease injection needle in patients. Said action may e.g. be altering the emitted light spectrum to minimize the damage of sensitive objects such as e.g. pieces of art or vegetables. Said class may e.g. indicate that the object is a trolley or crash cart, human or robot.

In an embodiment, the portable sensor may be embedded in at least one of: a (smart) mobile phone, a tablet, a smartwatch, smart glasses, an asset tag, a piece of clothing, a vehicle, a wristband, a ring, a microchip implant, or an employee badge, a hospital crash cart.

Moreover, in an embodiment, said first movement pattern may be associated with a first timestamp and said second movement pattern may be associated with a respective second timestamp and said processor is configured to: facilitate synchronization of a first clock used to determine said first timestamp and a respective second clock used to determine said respective second timestamp, and determine whether said first movement pattern matches with a respective second movement pattern by comparing said first movement pattern with said respective second movement pattern and comparing said first timestamp with said respective second timestamp.

It is a further object of the invention to provide an improved system, which at least alleviates the problems and disadvantages mentioned above. Thereto, the invention further provides a system for providing an action upon detecting an object in a space, the system comprising: the device according to the invention; a portable sensor associated with the object; and a wireless network comprising a plurality of electronic devices, wherein the electronic devices exchange wireless communication signals.

Said system may for example be advantageous as a lighting system, wherein the device may be a lighting device and the wireless network may be a wireless lighting network. Such a lighting system may thus comprise its first or initial lighting functionality, but may further or secondly provide a presence detection and/or movement detection functionality, without the need for additional presence detectors and or movement detectors (because the wireless connectivity and a suitability of the processing intelligence may be sufficient). Hence, in an embodiment, the system according to the invention is provided, wherein the wireless network is a wireless lighting network, wherein the device is part of the wireless network, and wherein the device further comprises a radiofrequency transceiver for communicating with at least one electronic device of the wireless lighting network.

The advantages and/or embodiments applying to the device according to the invention may also apply mutatis mutandis to the present system according to the invention.

It is a further object of the invention to provide an improved method of providing an action upon detecting an object in a space, which at least alleviates the problems and disadvantages mentioned above. Thereto, the invention further provides a method of providing an action upon detecting an object in a space, the method being performed by a device comprising a processor and comprising the steps of: obtaining sensor data recorded by a portable sensor associated with the object; determining a first movement pattern from said sensor data; obtaining communication data comprising wireless communication signals exchanged between electronic devices of a wireless network within said space; determining a second movement pattern from said communication data; determining whether said first movement pattern matches with said second movement pattern, so as to detect the object in said space; and performing an action upon determining a match.

The advantages and/or embodiments applying to the device and/or system according to the invention may also apply mutatis mutandis to the present method according to the invention.

The invention further relates to a computer program product. Hence, the invention provides a computer program product for a computing device, the computer program product comprising computer program code to perform a method of the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In aspects of the invention, it is provided: A device for providing an action upon detecting an object in a space, the device comprising a processor configured to: obtain sensor data recorded by a portable sensor associated with the object; determine a first movement pattern from said sensor data; obtain communication data comprising wireless communication signals exchanged between electronic devices of a wireless network within said space, wherein said wireless network comprises a function related to wireless communication and not related to presence detection and/or motion detection, wherein the wireless communication signals are not initially intended for presence detection and/or motion detection; determine a second movement pattern from said communication data; determine whether said first movement pattern matches with said second movement pattern, so as to detect the object in said space; and perform an action upon determining a match.

BRIEF DESCRIPTION OF THE DRAWINGS

The invention will now be further elucidated by means of the schematic non-limiting drawings.

DETAILED DESCRIPTION OF THE EMBODIMENTS

As mentioned, the device and/or system according to the invention meets the objective of detecting presence and/or motion of a specific object with fewer false positives, fewer false negatives, and/or false triggers.

Figure 1:
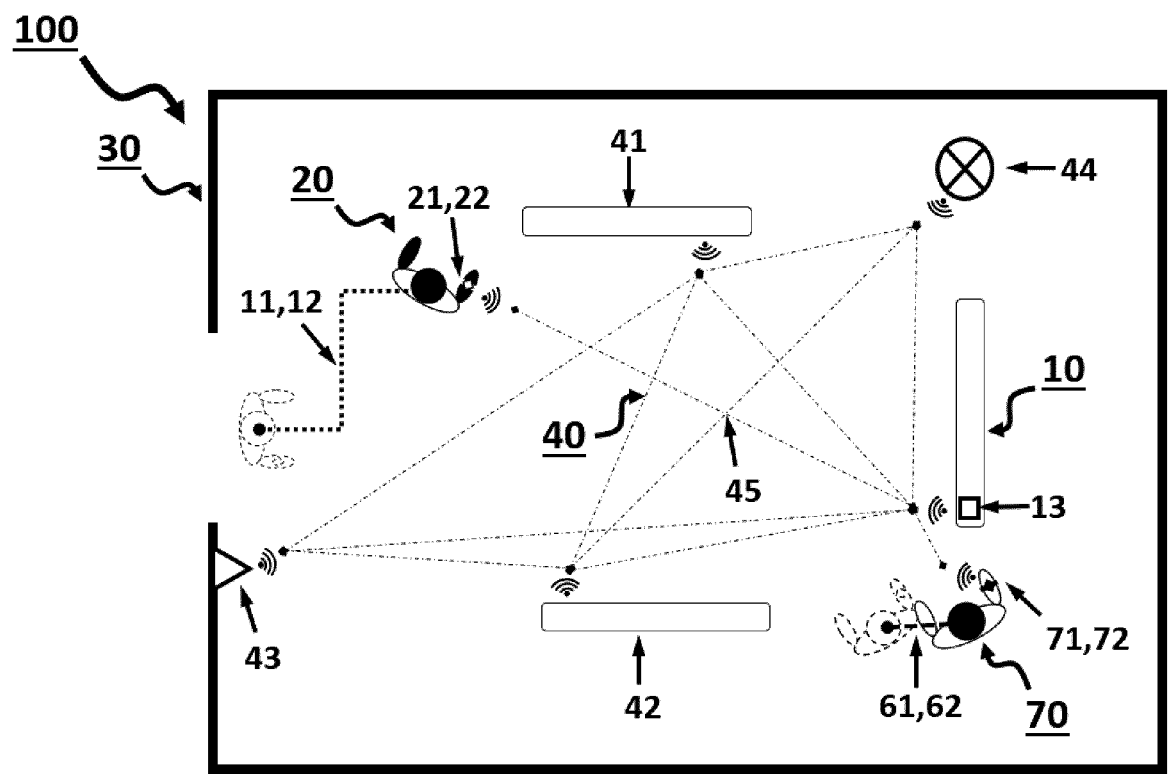
FIG. 1 depicts schematically an embodiment of a system according to the invention comprising the device according to the invention, a portable sensor associated with an object, and a wireless network comprising a plurality of electronic devices.

FIG. 1 depicts schematically, by non-limiting example, an embodiment of a system 100 according to the invention. The system 100 provides an action upon detecting an object 20 in a space 30. The space 30 is a room, but may alternatively be any other indoor or outdoor environment, e.g. in the retail domain or in the office domain. The object 20 is a person with an identity A. The space 30 also accommodates another object 70. Here, said another object 70 is a (humanoid) cleaning robot with an appearance of a person. Alternatively, the another object may be another person, yet alternatively at least one another object (e.g. a person) may be present within said space.

The system 100 comprises a device 10 according to the invention. The device 10 is a lighting device, more specifically a ceiling mounted luminaire. Alternatively, the device may be one of: a wall switch; a bridge; a (smart) speaker, such as e.g. speaker for voice control; a server; or a sensor device. Yet alternatively, the device may be a desk lamp, an anti-stumbling light close to the floor, or a LED strip for cove lighting. The device 10 does in the present non-limiting example not comprise dedicated hardware for presence detection and/or motion detection, such as e.g. a PIR sensor or MW sensor, but merely a radiofrequency (RF) transceiver (see reference 19 in FIG. 2) for wirelessly communicating with other wireless devices in a wireless network.

The system further comprises a wireless network 40 comprising a plurality of electronic devices 41, 42, 43, 44. The device 10 is part of said wireless network 40. The device 10 and said electronic devices 41, 42, 43, 44 may be in communication with each other and exchanging wireless communication signals. This may for example be broadcast or unicast messages. Said plurality of electronic devices 41, 42, 43, 44 comprises here: two luminaires 41, 42 mounted at the ceiling of said space 30 and similar to the device 10 according to the invention; a wireless wall switch 43 to control these ceiling mounted luminaires 10, 41, 42 in the room; and a standalone lighting device 44 having wireless connectivity. Since all mentioned (electronic) devices are lighting devices and/or lighting related, and the wireless network comprises a plurality of lighting devices, the wireless network 40 is a wireless lighting network. Here, the wireless lighting network is a ZigBee network.

Alternatively, such an electronic device mentioned above may be one of: a lighting device, a beacon, a sensor device, an actuator, a speaker, a smart assistant entity, a bridge, a computer, a mobile phone, a tablet, a smart wearable, a server, a television, a smart kitchen appliance, furniture, a building element, a HVAC entity, etc. Yet alternatively, the wireless network according to the invention may for example be a Wi-Fi network, a ZigBee network, a Bluetooth network, a GSM network, a proprietary protocol in a different frequency band, or a combination thereof.

The system 100 further comprises a wearable sensor 22 associated with the object 20. The wearable sensor 22 is embedded in a wearable device 21, which is here a bracelet worn by the person on its arm 20. Alternatively, the wearable sensor may be embedded in at least one of: a (smart) mobile phone, a tablet, a smartwatch, smart glasses, an asset tag, a piece of clothing, a vehicle, a wristband, a ring, a microchip implant, an employee badge. The wearable sensor may thus alternatively be any other portable sensor. The wearable sensor 22 is able to monitor/measure the movement of the person 20 (i.e. the object). Thus, the wearable sensor may be one of, or a set of one of: an accelerometer, an altimeter, a gyroscope, an orientation sensor, a magnetometer, a temperature sensor, a pressure sensor, a microphone, or any combination thereof, etc. The wearable device 21 provides wireless connectivity and sends sensor data (see reference 14 in FIG. 2) measured by the wearable sensor 22 to the device 10. The wearable device 21 may therefore also be part of wireless ZigBee network. Alternatively, said sensor data may be sent to a server, a memory, a cloud, from which the device can retrieve said sensor data.

Figure 2:
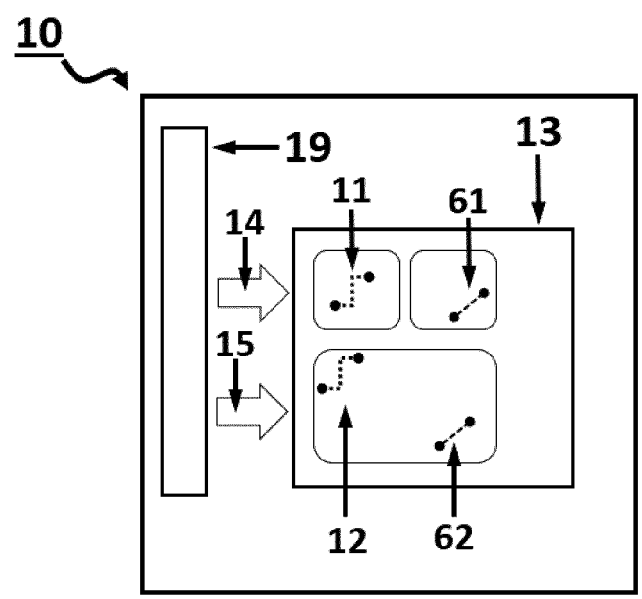
FIG. 2 depicts schematically an embodiment of a device according to the invention corresponding to the system depicted in FIG. 1.

Still referring to FIG. 1, and now also referring to FIG. 2, the device 10 comprises a processor 13. The processor 13 is configured to obtain said sensor data 14 of said wearable device 21 as measured by the wireless sensor 22. The processor 13 is therefore in communication or in connection with the RF transceiver 19 of the device 10. The sensor data 14 is recorded by the wearable sensor 22 of the object 20, which is the person 20 to be detected within the space 30. As mentioned: The sensor data 14 is received directly, via wireless communication, from said wearable device 21 in which the wearable sensor 22 is embedded. This communication of the sensor data 14 may in alternative examples occur via single or multiple hops. The sensor data may alternatively e.g. be retrieved from a database, a cloud, a memory device or server wherein the sensor data is logged.

From said obtained sensor data 14, a first movement pattern 11 is determined by the processor 13 of the device 10. Such a first movement pattern 11 may for example be determined by analyzing obtained accelerometer and/or gyroscope data (or alternatively other data from other sensors as mentioned before) present within the sensor data 14 recorded by the wearable sensor 21. This first movement pattern 11 characterizes the movement of said person 20. Moreover, in some alternative examples, the sensor data may be processed locally by the wearable sensor into a first movement pattern, which first movement pattern may subsequently be provided to the processor, such that the processor may obtain said first movement pattern directly.

Mutatis mutandis to the determination of the first movement pattern 11 of the object 20: the another object 70 (i.e. the humanoid robot) and the another object's first movement pattern 61 may be determined as well by the processor 13. Similarly, the another object 70, which is the humanoid robot, may comprise a sensor device 71 (i.e. a wearable device) comprising a wearable sensor 72. The processor 13 now has knowledge about the first movement pattern 11 of the person 20 and the first movement pattern 61 of the humanoid robot 70, but does not know yet (based on the respective sensor data 14 alone) where the person 20 or the humanoid robot 70 are precisely localized within said space 30. Radiofrequency based sensing may provide an outcome therefor, but common RF based sensing technology may not uniquely identify an object.

Therefore, still referring to FIG. 1 and FIG. 2, said processor 13 is also configured to obtain communication data 15, which comprises wireless communication signals 45 exchanged (in time) between the electronic devices 41, 42, 43, 44 (including itself) of the wireless lighting network 40 within said space 30.

Since the object 20 may interfere with said communication signals 45 of the wireless network 40 within said space 30 due to its body mass and water content, analyzing the communication data 15 serves as a basis for determining a second movement pattern 12 of the object 20. That is: the second movement pattern 12, which characterizes the movement of said object 20, may be determined via RF based sensing in the wireless ZigBee lighting network 40. Similarly, mutatis mutandis, the second movement pattern 62, which characterizes the movement of the another object 70 (i.e. the humanoid robot) may be determined via RF based sensing in the wireless ZigBee lighting network 40. The humanoid robot 70 may for example block or reflect more communication signals 45 of the wireless network 40 so that RF based sensing may determine its presence and location (e.g. more easily).

Here, the second movement pattern 12 of the object 20 is determined by measuring a change of the parameter RSSI of the wireless communication signals 45 of the wireless network 40. Said changes result from a distortion (or: an interference) of the object 20 with said wireless communication signals 45. The distortion (or: interference) will render a change of the RSSI of the wireless communication signals compared to a (calibrated) baseline RSSI. The changes may indicate a certain object of movement. The working of common RF based sensing may be known in the art.

Thus, the second movement pattern of the person 20 and the humanoid robot 70 may be determined. However, based on the wireless (RF) sensing alone the identity of the sensed and/or determined second movement patterns 12, 62 may not be found. Therefore, advantageously leveraging the combination of the wireless sensing with the sensing based on the sensor data 14 recorded locally by the wearable sensors 22, 72 associated with the objects 20, 70, the location and identity of said objects 20, 70 may be determined.

Namely: For detecting the person 20, the processor 13 determines whether the first movement pattern 11 of the person 20 matches with one of the two detected second movement patterns 12, 62 in said space 30. The processor 13 determines that the Z-shaped second movement pattern 12 determined within said space 30 matches with the Z-shaped first movement pattern 11 determined from the sensor data 14 obtained from the wearable device 21 and recorded with the wearable sensor 22, both associated with the object 20 (i.e. the person). The processor 13 now knows the detected location of the object 20, i.e. the person, which location is close to upper one luminaire 41 of the ceiling-mounted luminaires.

Upon determining such a match, the processor 13 performs an action. The action may thus be a personalized action, as it is known from the wearable sensor 22 and its respective sensor data 14 that object 20 is associated therewith. As mentioned, the object 20 is a person, thus the processor 13 instructs the ceiling-mounted luminaire 41 close to the person to turn on via a wireless instruction signal over the wireless network 40. These messages crowd the network and further improve further RF-based sensing. Other actions, as mentioned, may also be provided. The processor 13 may thus initiate or control a personalized effect to be provided.

Similarly, mutatis mutandis, the processor 13 determines whether the first movement pattern 61 of the humanoid robot 70 matches with one of the two detected second movement patterns 12, 62 in said space 30. The processor 13 determines that the first movement pattern 61 of the humanoid robot matches with the second movement pattern 62 detected near the device 10, which is the ceiling-mounted luminaire 10. Upon determining such a match, the processor 13 performs an action. The processor 13 instructs a speaker within said ceiling-mounted luminaire 10 to emit an ultrasound signal to provide the humanoid robot with a beacon. Such an action would not be provided if the match indicated that a person was detected, because the present invention allows for an accurate and personalized detection. The action may also include to switch on the lights surrounding the humanoid robot to a maximum light output or a special spectrum (such as e.g. UV) to enhance in a halo surrounding the humanoid robot a visibility of substances, such as e.g. dirt, by the cleaning robot's detection means, such as e.g. a camera.

Additionally, the processor 13 may take some time or some effort to determine the second movement patterns 12, 62. In order to improve the detection of the second movement pattern 12, 62 the processor is further configured to instruct the wall switch 43 (or alternatively another one of said electronic devices 41, 42, 44 or itself 10) to increase exchanging wireless communication signals. The wall switch 43 may for example send pilot signals or test messages to all the devices under its control. Furthermore, in alternative aspects, the device may comprise means (not depicted) to determine the effectiveness and/or speed of determining the second movement pattern. Whenever said effectiveness and/or speed falls below a predefined threshold, the processor may start instructing the at least one electronic device of said electronic devices to increase exchanging wireless communication signals; or the device itself boosts the exchange of wireless communication signals.

In an embodiment, not depicted, said first movement pattern may be associated with a first timestamp. Said second movement pattern may also be associated with a respective second timestamp. This means that the wearable device and the device comprise synchronized clocks. The processor may then determine whether said first movement pattern matches with a respective second movement pattern by comparing said first movement pattern with said respective second movement pattern and comparing said first timestamp with said respective second timestamp.

Figure 3:
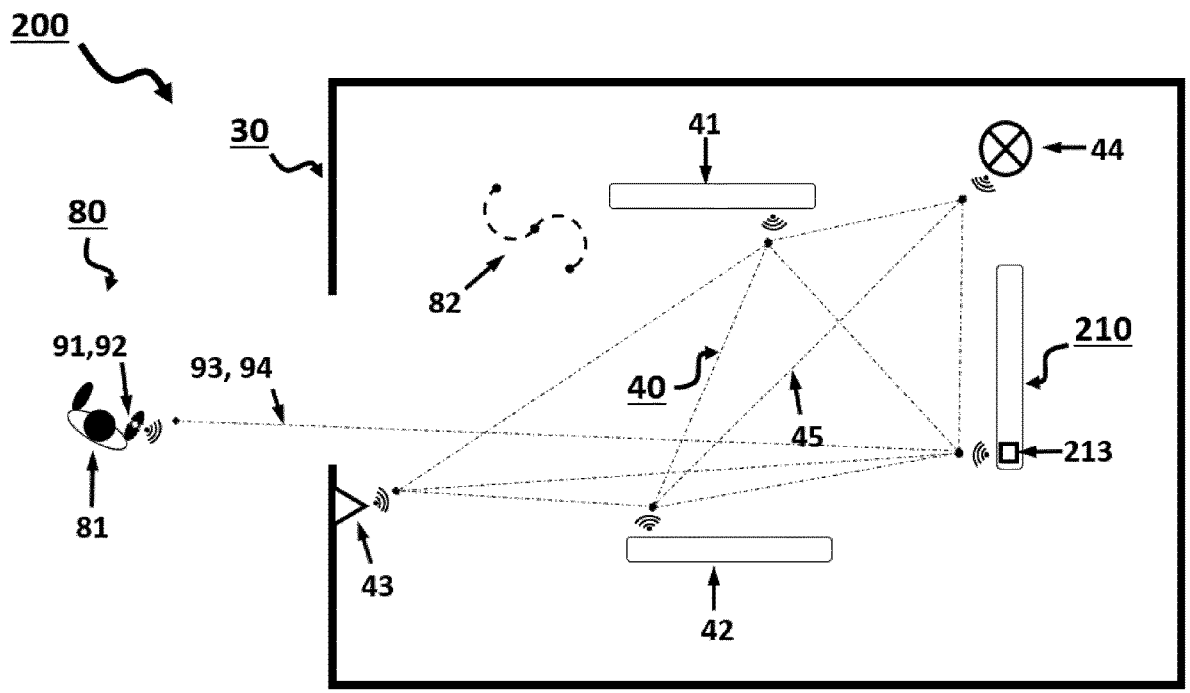
FIG. 3 depicts schematically an embodiment of a system according to the invention comprising the device according to the invention, a portable sensor associated with an object, and a wireless network comprising a plurality of electronic devices.

FIG. 3 depicts schematically, by non-limiting example, an embodiment of a system 200 according to the invention, which is partly similar to the embodiment in FIG. 1 and FIG. 2, but now the object 80 is not located within said space 30 but external thereto. The object 80 is a person. The person wears a smartphone 91 with a wearable sensor 92 to sense its motion. The person 80 is standing still, hence the wearable sensor 92 detects a stationary movement. The smartphone 91 determines a first movement pattern 81 based on measurements of the wearable sensor 92. The first movement pattern 81 is thereby sent as sensor data 93 to the processor 213 of the device 210 according to the invention, which is similarly as the embodiment depicted in FIG. 1 and FIG. 2 a ceiling-mounted luminaire. The smartphone 91 also sends identification data 94 to the processor 213 together with the sensor data 93. The processor 213 then determines the first movement pattern 81 from said sensor data 93 by receiving the first movement pattern 81 from the sensor data 93.

The processor further obtains communication data (not depicted) comprising wireless communication signals 45 exchanged between electronic devices 41, 42, 43, 44 of the wireless network 40 within said space 30. Based on RF-based sensing, as mentioned before, similar to the embodiment depicted in FIG. 1 and FIG. 2, a second movement pattern 82 is determined from said communication data. This second movement pattern 82 is detected within the space 30 and relates to a detection of a zig-zagging movement. This movement is by no means caused by the person 80; but may be caused by a false detection, by any other object within said space, etc.

Commonly known RF based sensing would detect said second movement pattern 82 and perform an action related thereto. For example, turn the lights on. However, it may only be required to turn the lights on when the specific person 80 is within the space 30, which is here not the case. Thus commonly known RF based sensing technology would render undesired detections.

In respect to the present invention, the processor 213 determines whether said first movement pattern 91 matches with said second movement pattern 82, so as to detect the object 80 within said space 30. However, there is no match, because the stationary first movement pattern 81 does not match the zig-zagging detected second movement pattern 82. As there is no match, no action will be performed.

In a further embodiment, not depicted, the embodiment depicted in FIG. 3 is provided, but now the person 80 enters said space 30. As the processor 213 has received the identification data 94 identifying the person 80, the action of the processor 213 is setting the lighting setting of all lighting devices 41, 42, 44, 210 within said space 30 to a lighting scene corresponding to the identity of the person 80. For example, whenever the person has pre-defined (commissioned) a welcoming lighting scene within said space 30 upon the device 210 and/or system 200 detecting specifically the person 80 entering the room, the device 210 and/or system 200 may instruct said lighting devices to provide said pre-defined (or personalized) scene. Further, for example, whenever another person enters said room, the device 210 and/or system 220 may provide another action, which corresponds to the identity of that particular another person entering.

Such an embodiment may prove advantageous in e.g. a following example: A family home has a living room with several lights distributed throughout the space. Their Philips Hue and corresponding Philips Hue system is the device and corresponding system according to the invention. The Philips Hue device has activated the motion sensing based on RF-based sensing (over the ZigBee network). That is, every time a person enters the room, the lights automatically go on because the RSSI on all the different links vary according to a pattern known to match that of a person moving around. However, the family members can't agree on which light setting to use since the default one doesn't properly suit anyone. With the present invention, each user carrying e.g. an smartwatch can be uniquely identified when entering a room and trigger the scene they've preselected, because the smartwatch can send sensor data required to determine the first movement pattern of each user.

Figure 4:
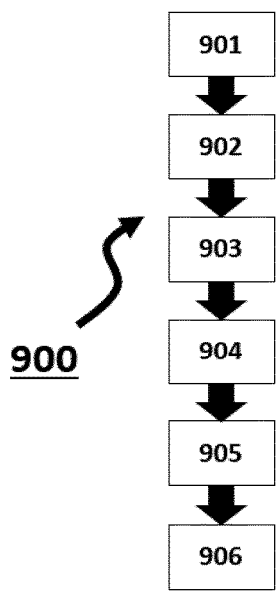
FIG. 4 depicts schematically an embodiment of a method according to the invention.

FIG. 4 depicts schematically, by non-limiting example, an embodiment of a method 900 of providing an action upon detecting an object in a space. The method being performed by a device according to the invention comprising a processor. The method comprises the step 901 of obtaining sensor data recorded by a wearable sensor associated with the object; and the step 902 of determining a first movement pattern from said sensor data. As a result, the movement of the object may be characterized. However, its location may still be unknown. The method therefore further comprises the step 903 of obtaining communication data comprising wireless communication signals exchanged between electronic devices of a wireless network within said space; and the step 904 of determining a second movement pattern from said communication data. Hence, the second movement pattern may provide a location, but may not arbitrate between different object's identities. Therefore, the method comprises the step 905 of determining whether said first movement pattern matches with said second movement pattern, so as to detect the object in said space; and step 906 of performing an action upon determining a match.

The invention claimed is:

1. A device for providing an action upon detecting an object in a space, the device comprising a processor configured to:
   obtain sensor data recorded by a portable sensor associated with the object;
   determine a first movement pattern from said sensor data;
   obtain communication data comprising wireless communication signals exchanged between electronic devices of a wireless network within said space;
   determine a second movement pattern from said communication data via radiofrequency based sensing;
   determine whether said first movement pattern matches with said second movement pattern, so as to detect the object in said space; and
   perform an action upon determining a match.

2. The device according to claim 1, wherein the device is part of the wireless network, and wherein the device further comprises a radiofrequency transceiver for communicating with at least one electronic device of the wireless network.

3. The device according to claim 1, wherein the wireless network is a wireless lighting network.

4. The device according to claim 1, wherein the device is one of: a lighting device, a wall switch, a bridge, a speaker, a server, a sensor device, a HVAC device, a window blind controller.

5. The device according to claim 1, wherein the second movement pattern is determined by measuring a change of a parameter of the wireless communication signals resulting from a distortion with said wireless communication signals.

6. The device according to claim 5, wherein the parameter is an RSSI value.

7. The device according to claim 1, wherein the processor is further configured to instruct at least one electronic device of said electronic devices to increase exchanging wireless communication signals.

8. The device according to claim 1, wherein the action is at least one of:
   inducing a visual signal, auditory signal, or vibrating signal;
   turning on a lighting device;
   providing a detection signal of having detected the object;
   localizing and identifying the object;
   adjusting the HVAC;
   adjusting the state of the security system;
   adjusting the emergency lighting system;
   adjusting the life safety system of the building
   dispensing a substance;
   actuating an emergency stop button.

9. The device according to claim 1, wherein the processor is configured to obtain identification data for identifying the identity and/or class of the object; and wherein the action further comprises setting a lighting setting of a lighting device based on the identity and/or class of the object.

10. The device according to claim 1, wherein the portable sensor is embedded in at least one of: a mobile phone, a tablet, a smartwatch, smart glasses, an asset tag, a piece of clothing, a vehicle, a wristband, a ring, a microchip implant, an employee badge, a hospital crash cart.

11. The device according to claim 1, wherein said first movement pattern is associated with a first timestamp and said second movement pattern is associated with a respective second timestamp and said processor is configured to: facilitate synchronization of a first clock used to determine said first timestamp and a respective second clock used to determine said respective second timestamp, and determine whether said first movement pattern matches with a respective second movement pattern by comparing said first movement pattern with said respective second movement pattern and comparing said first timestamp with said respective second timestamp.

12. A system for providing an action upon detecting an object in a space, the system comprising:
   the device according to claim 1;
   a portable sensor associated with the object; and
   a wireless network comprising a plurality of electronic devices, wherein the electronic devices exchange wireless communication signals.

13. The system according to claim 12, wherein the wireless network is a wireless lighting network, wherein the device is part of the wireless network, and wherein the device further comprises a radiofrequency transceiver for communicating with at least one electronic device of the wireless lighting network.

14. A method of providing an action upon detecting an object in a space, the method being performed by a device comprising a processor and comprising the steps of:
   obtaining sensor data recorded by a portable sensor associated with the object;
   determining a first movement pattern from said sensor data;
   obtaining communication data comprising wireless communication signals exchanged between electronic devices of a wireless network within said space;
   determining a second movement pattern from said communication data via radiofrequency based sensing;
   determining whether said first movement pattern matches with said second movement pattern, so as to detect the object in said space; and
   performing an action upon determining a match.

15. A computer program product for a computing device, the computer program product comprising a non-transitory computer readable media having a computer program code to perform the method of claim 14 when the computer program product is run on a processing unit of the computing device.

* * * * *